United States Patent [19]

Lin

[11] Patent Number: 5,724,752

[45] Date of Patent: Mar. 10, 1998

[54] WATER-PROOFING LOCATING DEVICE OF A BICYCLE SHOE

[76] Inventor: Wen-Hwa Lin, No. 41, 36th Rd., Industrial Park, Taichung, Taiwan

[21] Appl. No.: 764,927

[22] Filed: Dec. 16, 1996

[51] Int. Cl.[6] ............................. A43B 5/00; G05G 1/14
[52] U.S. Cl. ........................... 36/131; 36/134; 74/594.6
[58] Field of Search ................. 36/131, 134; 74/594.6, 74/594.5, 594.4

[56] References Cited

U.S. PATENT DOCUMENTS 5,079,968  1/1992  Starner ........................... 36/131
5,473,963  12/1995  Aeschbach ..................... 36/131
5,657,558  8/1997  Pohu ............................... 36/131

Primary Examiner—M. D. Patterson
Attorney, Agent, or Firm—Varndell Legal Group

[57] ABSTRACT

A water-proof bicycle shoe locating device adapted for fastening to the sole of a bicycle shoe for permitting the bicycle shoe to be secured to one pedal of a sports bicycle, the device including a rigid locating plate, a rubber cushion and a rubber packing plate respectively covered on both sides of the locating plate, the locating plate having screw holes adapted for mounting locating screws selectively, the rubber packing plate having detachable downward split rods adapted for fitting into vacant screw holes of the locating plate to seal the gaps.

1 Claim, 3 Drawing Sheets

WATER-PROOFING LOCATING DEVICE OF A BICYCLE SHOE

BACKGROUND AND SUMMARY OF THE INVENTION

The present invention relates to bicycle shoes, and more specifically to a water-proofing locating device adapted for fastening to a bicycle for permitting it to be secured to one pedal of a sports bicycle.

When pedaling the pedals of a sports bicycle at a high speed, the shoes tend to slip from the blocks of the pedals. There are bicycle shoes equipped with a locating device adapted for securing to the pedals of a sports bicycle. The locating device for this purpose has pairs of screw holes for mounting locating screws selectively. However, because the screw holes which are not occupied are not sealed, rain water will pass through the vacant screw holes to wet the inside of the shoe.

The present invention has been accomplished to provide a water-proofing locating device for bicycle shoes which eliminates the aforesaid problem. According to the present invention, the water-proofing locating device comprises a rigid locating plate, a rubber cushion and a rubber packing plate respectively covered on both sides of the locating plate, wherein the locating plate has screw holes adapted for mounting locating screws selectively, the rubber packing plate has detachable downward split rods adapted for fitting into vacant screw holes of the locating plate to seal the gaps.

DETAILED DESCRIPTION OF THE PREFERRED EMBODIMENT

Figure 1:
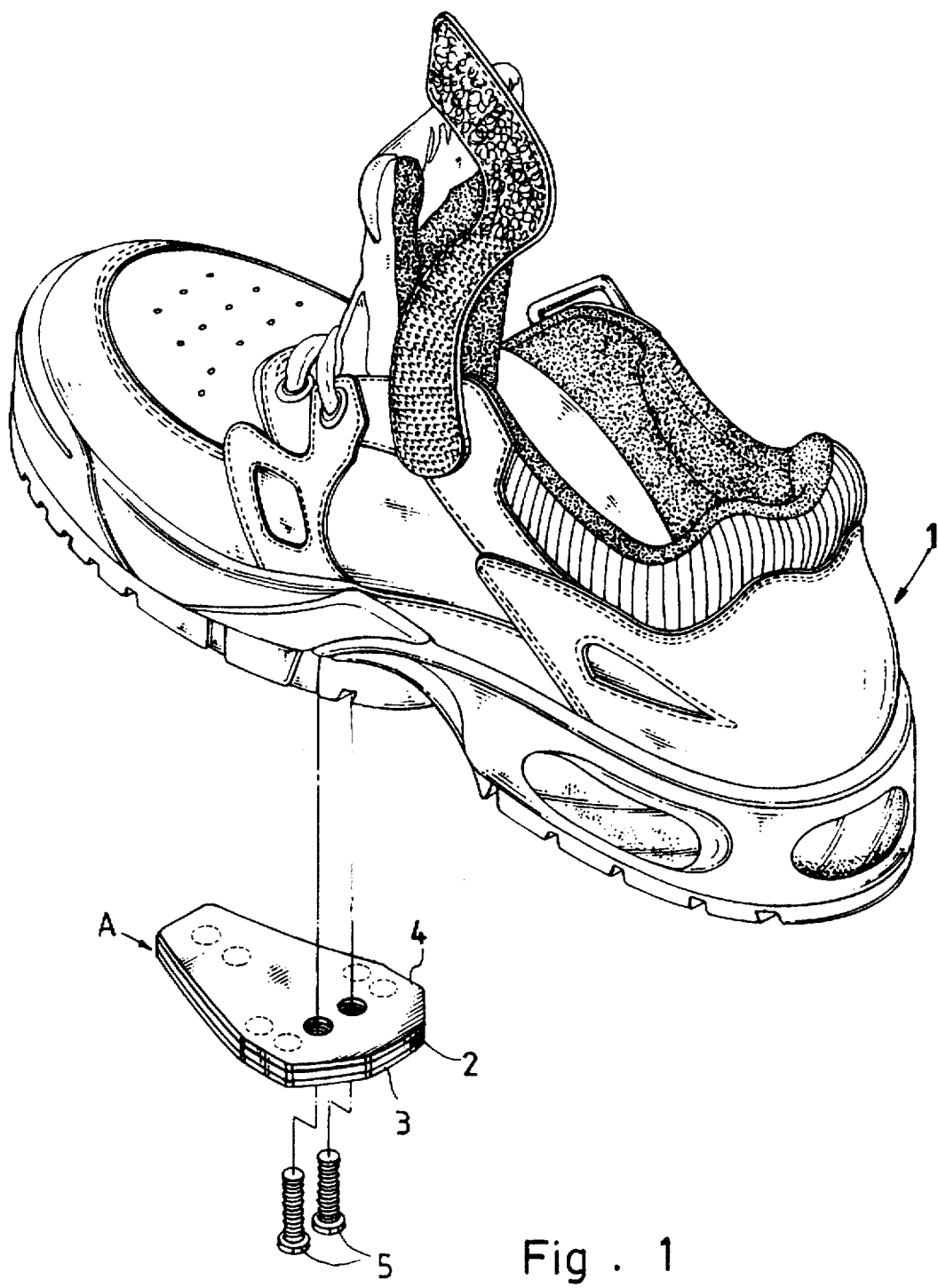
FIG. 1 shows the relationship between a bicycle shoe and a water-proofing locating device according to the present invention.
Figure 2:
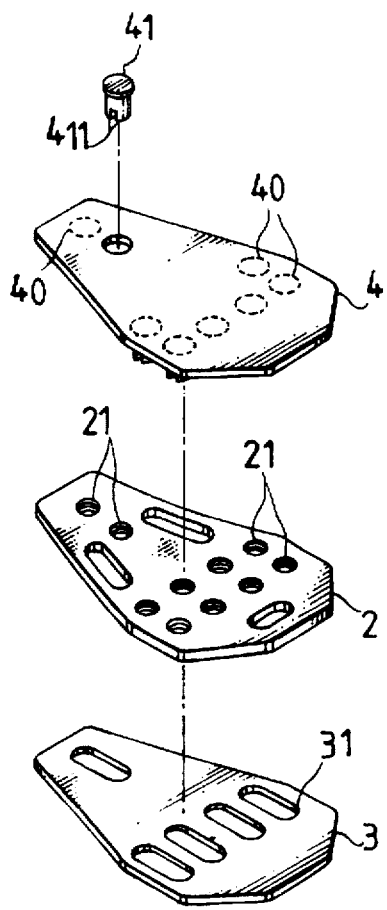
FIG. 2 is an exploded view of the water-proofing locating device shown in FIG. 1.
Figure 3:
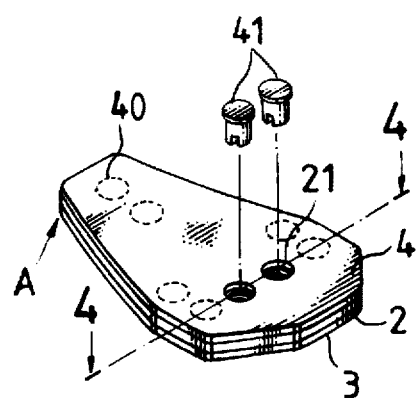
FIG. 3 is a perspective elevational view of a water-proofing locating device according to the present invention, showing two downward split rods detached from the rubber packing plate.
Figure 4:
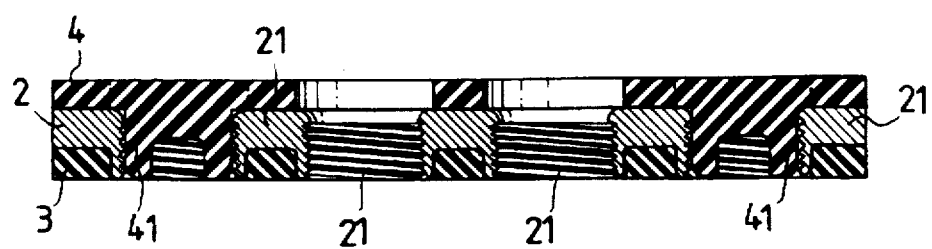
FIG. 4 is a sectional view taken along line 4—4 of FIG. 3.

Referring to FIGS. from 1 to 4, a water-proofing locating device A is shown adapted for fastening to the sole of a bicycle shoe 1, so that the bicycle shoe 1 can be secured to one pedal of a sports bicycle. The water-proofing locating device A is comprised of a locating plate 2, a rubber cushion 3, a rubber packing plate 4. The locating plate 2 is retained between the cushion 3 and the rubber packing plate 4, having rows of screw holes 21 adapted for receiving locating screws 5 selectively. The rubber cushion 3 has a plurality of oblong through holes 31 corresponding to the rows of screw holes 21, for permitting locating screws 5 to pass. The rubber packing plate 4 has a plurality of downward split rods 41 adapted for fitting into the screw holes 21. Each of the downward split rods 41 has longitudinal splits 411. Through the longitudinal splits 411, the downward split rods 41 can be respectively and radially compressed, and then respectively fitted into the screw holes 21 of the locating plate 2. Cut lines 40 are respectively made on the rubber packing plate 4 around each downward split rods 41. Through the cut lines 40, the downward split rods 41 can be selectively detached from the rubber packing plate 4. During the installation process, the user can decide which screw holes of the locating plate 2 to be mounted with locating screws 5, then detach the corresponding downward split rods 41 from the rubber packing plate 4 for permitting corresponding locating scress 5 to pass, and then fastening the remains of the downward split rods 41 to the screw holes 21 which are not occupied. Because the screw holes 21 of the locating plate 2 which are not occupies are sealed by the corresponding split rods 41, water is prohibited from passing through the locating plate 2 and the rubber packing plate 4 to be inside of the shoe 1.

I claim:

1. A water-proof bicycle shoe locating device adapted for fastening to the sole of a bicycle shoe for permitting the bicycle shoe to be secured to one pedal of a sports bicycle, the device comprising a rigid locating plate having rows of screw holes adapted for mounting locating screws selectively, a rubber cushion adapted for fastening to said locating plate at an outer side and having a plurality of oblong through holes corresponding to the rows of screw holes of said locating plate, and a rubber packing plate adapted for fastening to said locating plate at an inner side, said rubber packing plate comprising a plurality of downward split rods adapted for fitting into the screw holes of said locating plate to seal the gaps, and a plurality of cut lines respectively disposed around each of said downward split rods for permitting said downward split rods to be selectively detached from said rubber packing plate for permitting a respective locating screw to pass.

* * * * *